United States Patent [19]

Boiron et al.

[11] Patent Number: 4,462,956
[45] Date of Patent: Jul. 31, 1984

[54] APPARATUS FOR PARTITIONING OFF THE CORE OF A NUCLEAR REACTOR WITH REMOVABLE ELEMENTS

[75] Inventors: Pierre Boiron, Sceaux; Pierre Poitrenaud, Elancourt, both of France

[73] Assignee: Framatome, Courbevoie, France

[21] Appl. No.: 251,836

[22] Filed: Apr. 8, 1981

[30] Foreign Application Priority Data

Apr. 25, 1980 [FR] France .................. 80 09309

[51] Int. Cl.³ ............................................ G21C 11/00
[52] U.S. Cl. .................................. 376/287; 376/285; 376/400; 376/342; 376/254; 376/328
[58] Field of Search .............. 376/283, 285, 287, 289, 376/302, 303, 304, 399, 400, 445, 448, 453, 454, 462, 364, 365, 377, 390, 362; 176/78

[56] References Cited

U.S. PATENT DOCUMENTS

| 3,971,575 | 7/1976 | Lesham et al. | 376/446 X |
| 3,987,860 | 10/1976 | Jabsen | 376/302 |
| 4,146,430 | 3/1979 | Berringer | 376/302 X |
| 4,158,605 | 6/1979 | Cooper et al. | 376/400 |
| 4,174,257 | 11/1979 | Calvin | 376/365 |
| 4,199,403 | 4/1980 | Puri et al. | 376/302 |
| 4,311,560 | 1/1982 | Verdone | 376/285 X |

FOREIGN PATENT DOCUMENTS

| 2305997 | 8/1973 | Fed. Rep. of Germany | 376/364 |
| 2818886 | 4/1979 | Fed. Rep. of Germany | 376/400 |

*Primary Examiner*—Richard E. Schafer
*Assistant Examiner*—Daniel Wasil
*Attorney, Agent, or Firm*—Pollock, Vande Sande & Priddy

[57] ABSTRACT

Apparatus for partitioning off the core of a nuclear reactor constituted by a set of boxes (8, 9, 10, 11) each comprising at least two plates (12-13, 14-15, 27-29, 28-30) rigidly assembled at right angles and disposed in the longitudinal direction of the assemblies, and a plurality of transverse plates (32) perpendicular to the longitudinal plates. The boxes are removably disposed side by side inside the core casing (1), and bearing thereon. The faces of the longitudinal plates directed towards the reactor core serve as bearing faces for the assemblies. Each of the boxes is fixed to at least one of the upper or lower plates of the core by a flexible coupling allowing longitudinal displacement.

9 Claims, 7 Drawing Figures

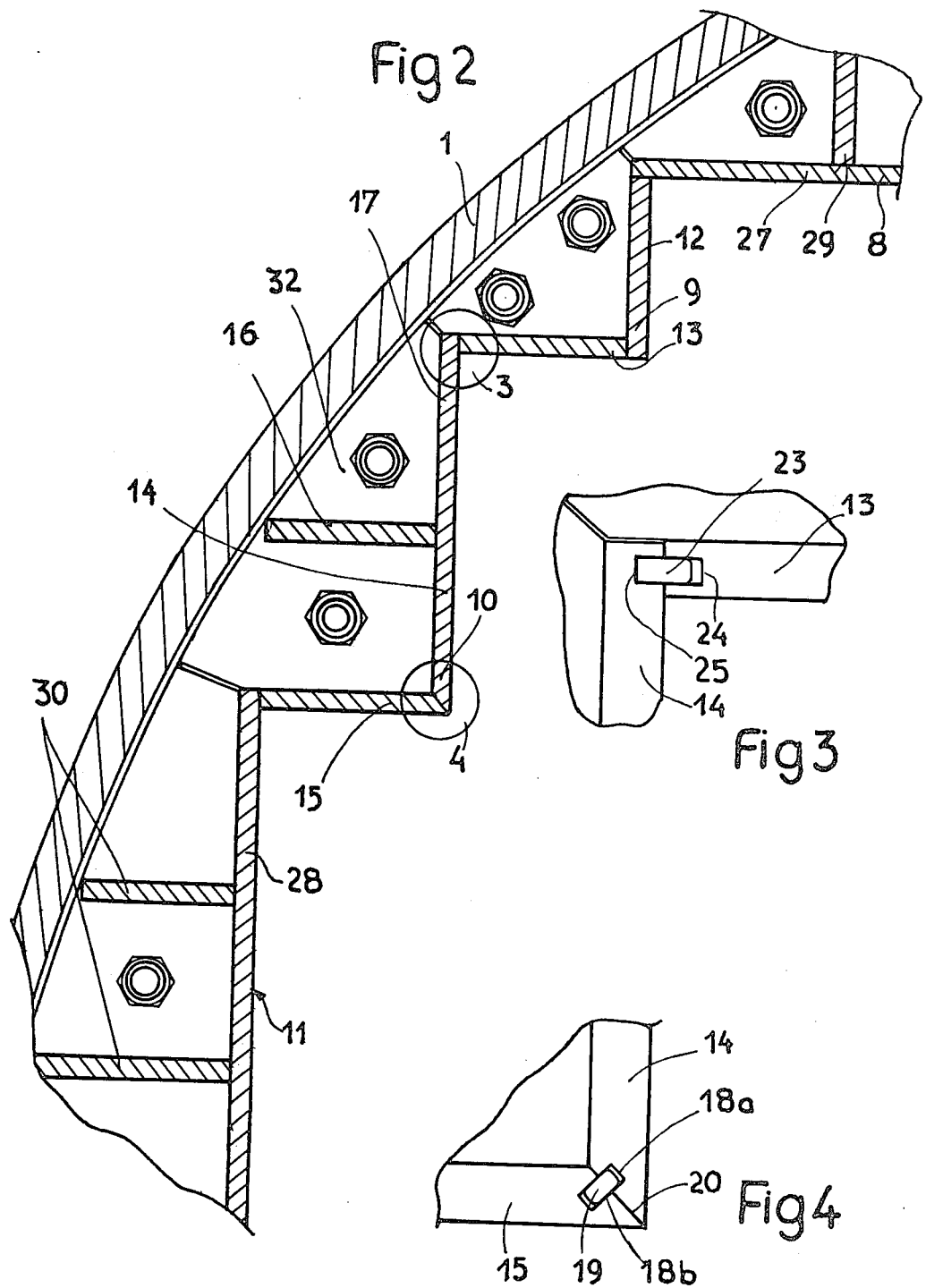

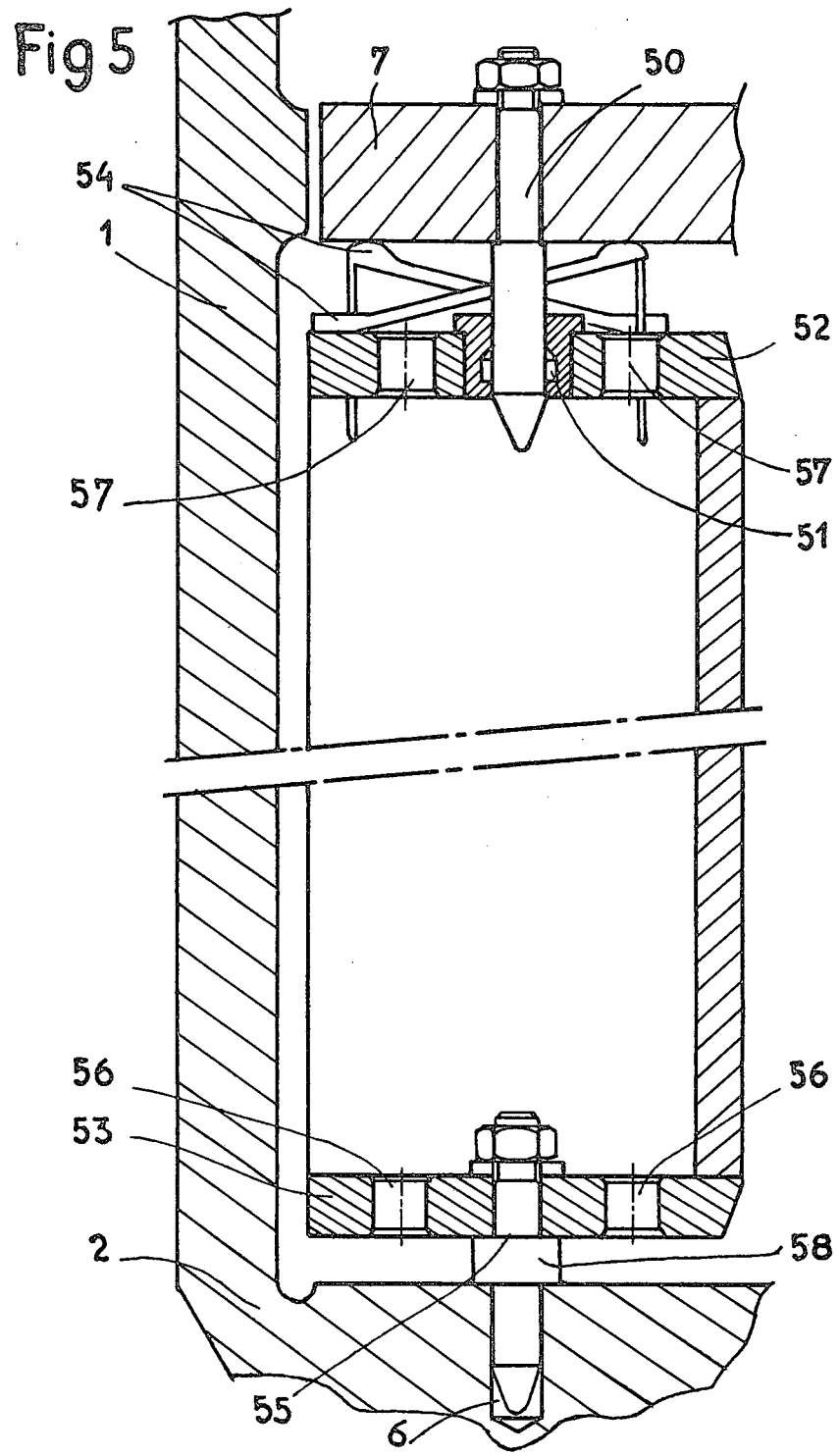

APPARATUS FOR PARTITIONING OFF THE CORE OF A NUCLEAR REACTOR WITH REMOVABLE ELEMENTS

FIELD OF THE INVENTION

The invention concerns an apparatus for partitioning off the core of a nuclear reactor with removable elements, the core of the reactor being constituted by juxtaposed prismatic assemblies inside a casing laterally bounding a space surrounding the core in which a cooling liquid circulates.

BACKGROUND

In nuclear reactors, particularly in pressurized water nuclear reactors, the core of the reactor constituted by a set of prismatically shaped assemblies, usually of square section and disposed vertically, has a cooling liquid passing through it, usually water, in the longitudinal direction of the assemblies to cool the latter and transfer heat from the core to the steam generators.

In pressurized water reactors, the square section assemblies are disposed vertically and the pressurized cooling water itself circulates in the vertical direction in contact with the fuel assemblies constituted by a set of tubes containing the combined fissionable material in the form of a bundle.

The whole core is disposed in a casing skirt which is usually cylinder-shaped like the vessel which contains the core and its attached fittings immersed in the cooling liquid.

The set of assemblies constituting the core presents a section of irregular shape comprising steps which fit inside the section of the casing skirt, so that an annular fuel-less region is formed between the peripheral assemblies and the casing skirt.

To preserve the initial geometry of the core and prevent the coolant from circulating freely in this region and channel it to the core proper, the use of a partitioning assembly which exactly matches the contour of the core is known. Fixing this partitioning assembly poses problems of practical implementation connected with the fact that there are very strict requirements for dimensional accuracy for this assembly and that the conditions prevailing in the reactor vessel in service (pressure, temperature and radiation) make it necessary to take account of the possibility of the structure deforming in various ways in service.

Reactor partitioning apparatuses of the prior art are usually formed in one piece and constituted by longitudinal partitioning plates fixed to transverse reinforcement plates termed shapers which are themselves fixed to the cylindrical core casing. Such one-piece structures are difficult to make, and positioning and fixing them inside the cylindrical skirt encasing the core is also a tricky operation. The unit constituted by the casing skirt and the partitioning apparatus must in fact provide a perfectly defined space for the assemblies constituting the reactor core and withstand deformations in service inside the reactor vessel.

In addition, the devices for fixing the elements constituting this complex structure, whether constituted by screws or lugs associated with welds, are extremely sensitive to the mechanical stresses and to the neutron fluxes which the structure must withstand inside the vessel of the reactor when the latter is in service.

The object of the invention is therefore an apparatus for partitioning off the core of a nuclear reactor with removable elements, the core of the reactor being constituted by prismatic assemblies juxtaposed inside a casing laterally bounding a space surrounding the core in which a cooling liquid circulates in the longitudinal direction of the assemblies, a lower support plate and an upper support plate also being disposed on either side of the core in the longitudinal direction. The partitioning apparatus has a structure which facilitates its construction and positioning in the casing skirt of the core and assures that its deformations under the effect of conditions prevailing in the core of the reactor in service are compatible with the functions of the partitioning apparatus and allow deterioration of the connecting elements of the structure to be avoided.

To achieve this object, the partitioning apparatus according to the invention is constituted by a set of boxes, each comprising at least two plates rigidly assembled at right angles, disposed in the longitudinal direction of the assemblies, and a plurality of transverse plates perpendicularly disposed to the longitudinal plates and rigidly assembled to the plates, these boxes being disposed removably side by side inside the core casing and bearing thereon, so that the faces of the longitudinal plates directed towards the reactor core serve as bearing faces for the assemblies disposed at the periphery of the core, each box being fixed to at least one of the upper or lower support plates, at at least one of its ends, by a flexible coupling allowing longitudinal displacements of the box.

BRIEF DESCRIPTION OF THE DRAWINGS

In order that the invention may be more clearly understood, several embodiments of the partitioning apparatus according to the invention applied in the case of a pressurized water nuclear reactor will now be described by way of example with reference to the attached drawings, in which

FIG. 2 is a section view along line A—A of FIG. 1.

FIG. 3 shows the detail denoted 3 in FIG. 2 on an enlarged scale.

FIG. 4 shows the detail denoted 4 in FIG. 2 on an enlarged scale.

FIG. 5 is a vertical sectional view of a second embodiment of one box of the partitioning apparatus.

DETAILED DESCRIPTION

Figure 1:
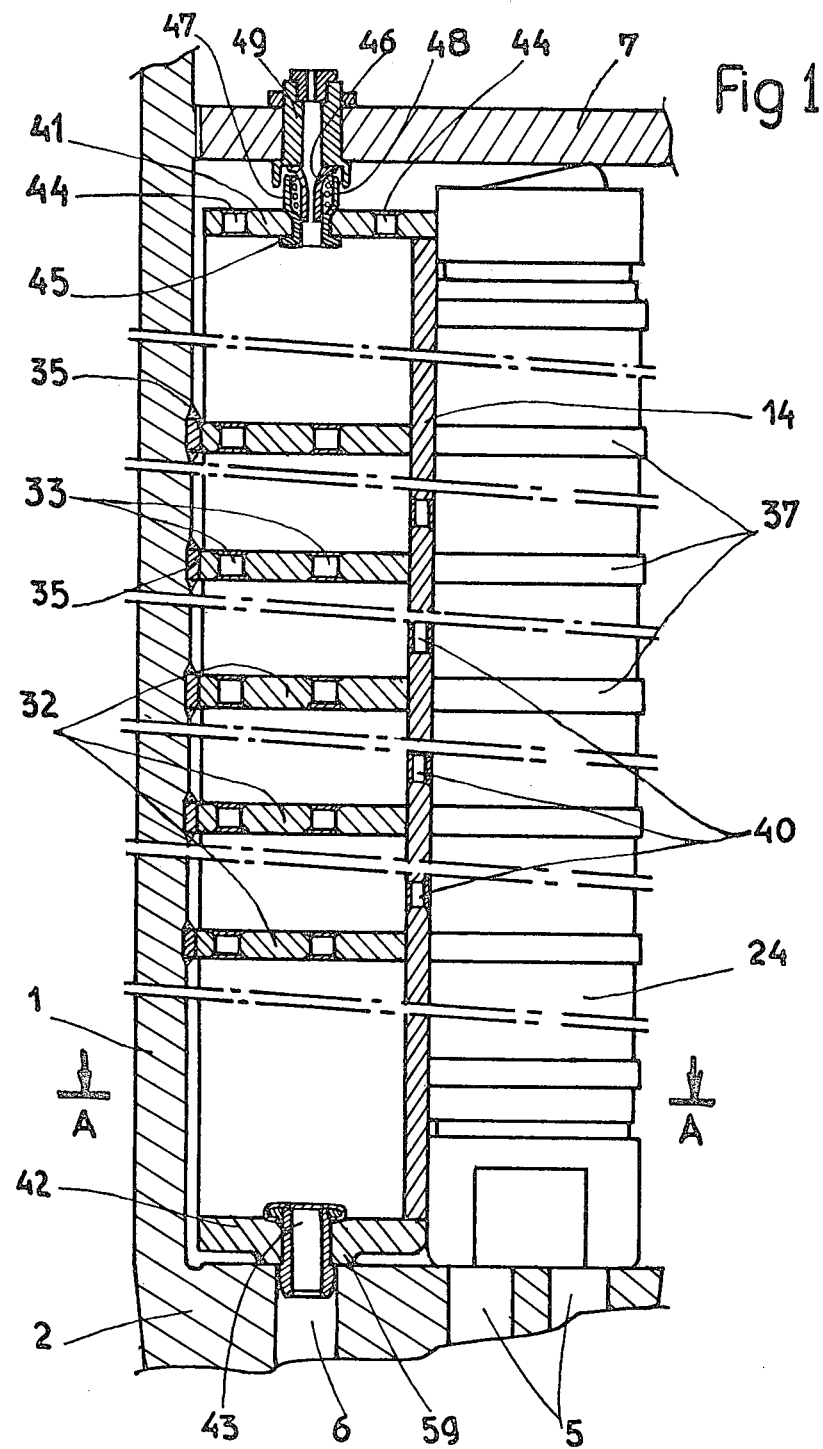
FIG. 1 is a vertical sectional view of part of the partitioning apparatus in position inside the casing skirt of the reactor core.

FIG. 1 shows one part of the cylindrical casing skirt 1 of the core the axis of which is vertical, in position in the reactor vessel.

This casing skirt 1 is solid with a base plate 2 on which the fuel assemblies 24 constituting the reactor core rest.

The base plate 2 is pierced with holes 5 for the cooling water to pass through the reactor core and holes 6 for positioning the partitioning apparatus.

The apparatus also includes an upper plate 7 allowing the partitioning apparatus to be fixed.

The assemblies 24 are held in fixed positions between the plates 2 and 7 which bound the core at its upper part and its lower part.

FIG. 2 shows a part of the partitioning apparatus comprising boxes 8, 9, 10 and 11 juxtaposed with respect to each other at the periphery of the casing skirt 1, so as to provide in the central part of this casing location for the reactor core constituted by the assemblies 24.

The box 9 is constituted by two vertical plates 12 and 13, i.e., disposed in the longitudinal direction of the assemblies.

The box 10, a sectional view of which at a vertical plane is represented in FIG. 1, is constituted by two vertical plates 14 and 15, disposed at right angles in accordance with the joint represented in detail in FIG. 4 and by a reinforcing plate 16 perpendicular to the plate 14 which is welded to the latter, at its outer face 17 which is directed towards the casing 1.

As FIG. 4 shows, the two plates 14 and 15 have grooves 18a and 18b, respectively, machined in a direction perpendicular to their common joint faces 20 which form an angle of 45° with the inner faces of the plates 14 and 15.

A key 19 allows the faces 14 and 15 to be joined to constitute the inner wall of the box 10.

The boxes 9 and 10 can also be joined together by means of a key 23 introduced into the grooves 24 and 25 provided in the vertical plates 13 and 14, respectively, over the whole of their length.

The boxes 8 and 11 are constituted by very wide plates 27 and 28 respectively, with vertical stiffening plates 29 and 30 respectively welded to the outer face.

The set of inner faces of the vertical plates 12, 13, 14, 27 and 28 consitute the bearing faces for the fuel assemblies 24 disposed at the periphery of the core.

It is therefore clear that the boxes can be of several types, but in all cases they include at least two vertical plates rigidly joined and perpendicular to each other.

FIG. 1 shows the box 10 in a sectional view at a vertical plane.

This box 10 is constituted not only of vertical plates like 14 but also of horizontal reinforcing plates 32 pierced with holes 33 for passage of the cooling water. FIG. 2 shows that these reinforcing plates 32 are disposed in the dihedral angles provided between the vertical plates and that their exterior contour consists of a portion of a circle so that they bear on the annular bearing pieces 35 fixed on the interior wall of the casing skirt 1.

FIG. 1 shows that the horizontal plates 32 and the annular bearing pieces 35 are disposed level with the brace-gratings 37 of the assembly 24.

Orifices 40 are provided in the vertical plate 14 to balance the pressure between the reactor core and the interior of the box 10.

The box 10 also includes an upper reinforcing plate 41 and a lower reinforcing plate 42 which are held by screws at the ends of the vertical plate 14.

On the lower reinforcing plate 42, a hollow centering piece 43 is fixed which, when the box 10 is positioned, locates in a through hole 6 provided in the lower support plate 2. The lower plate 42 rests on the support plate 2 through a boss 59.

The upper reinforcing plate 41 has orifices for passage of the cooling water 44 and an orifice 45 allowing the box to be fixed with respect to the upper plate 7.

The apparatus for fixing the box to the upper support plate 7 is constituted by a centering piece in two parts 46 and 47, sliding one inside the other with interposition of a spring 48 borne by the upper reinforcing plate 41 of the box and by a bearing piece 49 solid with the upper plate 7.

When the plate 7 is positioned above the boxes, the devices 49 come into position on the centering pieces 46, 47 which has the effect of compressing the spring 48 which allows the box to be fixed in position between the two plates 2 and 7.

Each box is thus held in position without its fixing in any way preventing expansion of the box and displacements in the longitudinal direction.

The box is not actually connected to the casing skirt 1 by any rigid fixing means, the boxes simply being supported through the reinforcing plates 32 on the bearing rings 35.

FIG. 5 shows a variant of the apparatus for fixing the boxes with respect to the plates 2 and 7.

In this variant, a centering piece 50 solid with the upper plate 7 engages in an opening 51 provided in the upper reinforcing plate 52 of the box.

Leaf springs 54, solid with the reinforcing plate 52 of the box, are compressed by the plate 7 when this plate 7 is positioned above the reactor core.

The box is thus held in position by the compression force of the springs, the lower reinforcing plate 53 of the box bearing a centering piece 55 which engages in a blind hole 6 in the support plate 2. The centering piece 55 has a thick median part 58 limiting the position of the box in height.

The opening 51 provided in the plate 52 has a profiled shape allowing introduction of a tool for lifting the box to remove or position it.

Openings 56 for the passage of water are provided in the lower plate 53 and openings 57 are also provided in the upper plate 52.

Figure 6:
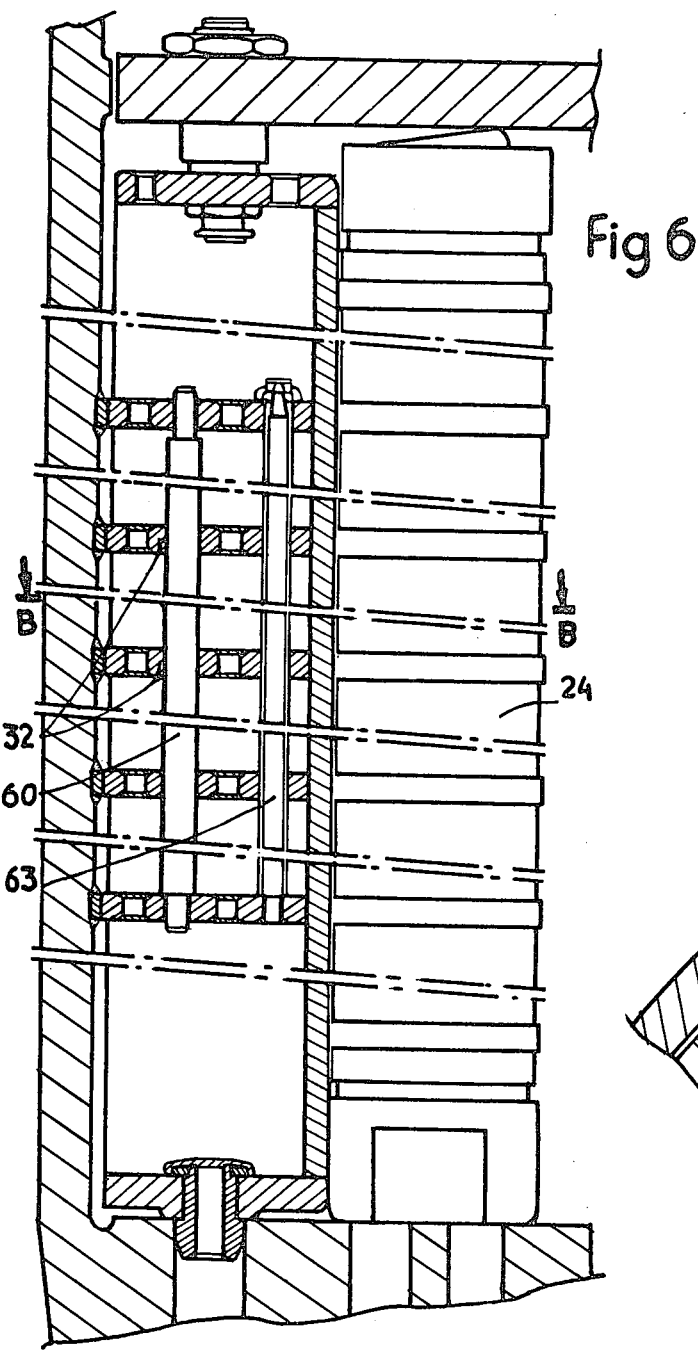
FIG. 6 is a vertical sectional view of one box of the partitioning apparatus according to the invention having protective elements and measuring elements.
Figure 7:
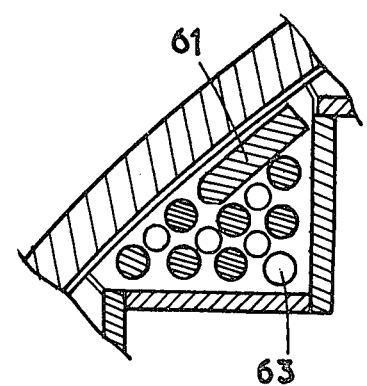
FIG. 7 is a section view along line B—B of FIG. 6.

FIGS. 6 and 7 show a box like the box 10 represented in FIG. 1, in which bars 60 and plates 61 have been inserted, in openings provided in the reinforcing plates 32, to absorb neutrons and limit radiation to the exterior of the core casing and the nuclear reactor vessel, or in addition to produce radioactive elements.

FIGS. 6 and 7 also show an apparatus 63 for measuring the neutron power released by the core at the location concerned, for measuring the radiation dose received at this location and if necessary for injecting liquid poison or sampling cooling liquid in the vicinity of the reactor core.

The boxes are disposed about the reactor core in the required number and according to a distribution determined to provide the assemblies 24 with a location corresponding exactly to the section of the reactor core.

The boxes are assembled as shown in FIG. 3 by keys inserted in grooves cut in each of the vertical plates for contact between the boxes, so that leaking of fluid between the plates such as 13 and 14 is greatly limited.

Positioning of the boxes inside the casing skirt 1, which is itself disposed in the reactor vessel, can clearly be carried out very easily since each box need simply be placed in position inside the casing skirt with a handling tool engaged in the opening provided in the upper reinforcing plate of the box.

The box is then brought into contact with each of the bearing rings 35 of the casing skirt 1 through its horizontal reinforcing plates 32.

When all the boxes have been put in place, the assemblies 24 which are to form the core can be positioned, and then the upper support plate 7 can be put in place. When this plate 7 is correctly oriented, the upper centering pieces come into position at each of the boxes which are themselves centered with respect to the base plate 2 by means of centering pieces solid with the lower reinforcing plates. The boxes are then held in position by compression of the springs the force of which is applied against the upper reinforcing plate of the box and the support plate 7.

The principal advantage of the apparatus according to the invention is that it allows the partitioning apparatus to be more simply constructed, by separate, removable elements, so as to facilitate positioning of this partitioning apparatus and to allow the partitioning to move under the effect of expansion or stresses of mechanical origin or due to radiation.

It is possible to fix the position of the boxes with respect to the casing 1 not only by means of centering pieces solid with the lower reinforcing plate of the box, but also by means of keys engaged in grooves provided in the horizontal reinforcing plates of the box and in the bearing rings of the casing skirt which are brought into coincidence when the box is positioned.

It is also possible to provide devices for connecting the vertical plates of the boxes other than by the groove-and-key devices which have been described.

It is also possible to provide means for fixing the vertical stiffening plates of these boxes other than by welded joints, e.g., by screw fixing means. It is also possible to envisage flexible coupling means between the boxes and the upper or lower support plates other than the spring apparatuses described. Connecting apparatuses of the pneumatic or hydraulic type are conceivable, for example. Also, the type of box which has been described has two vertical plates disposed at right angles, two vertical plates disposed at right angles and a reinforcing plate or a very wide vertical plate associated with the reinforcing plates welded to one of its faces. Very evidently other shapes of boxes are conceivable as a function of the arrangement of the core, as long as these boxes always include at least two vertical plates disposed at right angles.

The horizontal reinforcing plates in the apparatus described are disposed so as to occur at a level corresponding to the brace-grating level of the fuel assemblies, but these horizontal reinforcing plates can obviously be arranged in a different distribution.

Lastly, the partitioning apparatus described is applicable not only to pressurized water nuclear reactors but also to all water nuclear reactors and also to any other type of reactor with a core constituted by juxtaposed prismatic assemblies inside a casing bounding a space surrounding the core.

We claim:

1. A device for partitioning off the core of a pressurized nuclear water reactor, said reactor core being constituted by prismatic assemblies juxtaposed inside a core casing laterally bounding a space surrounding said core in which a cooling liquid circulates in the longitudinal direction of said assemblies, a transverse lower support plate and a transverse upper support plate also being disposed at either side of said core in the longitudinal direction, said device comprising (a) a set of boxes (8, 9, 10, 11) each including at least two plates (12-13, 14-15, 27-29, 28-30) rigidly assembled at right angles and disposed in the longitudinal direction of said assemblies (24); and (b) a plurality of transverse plates (32) perpendicular to said longitudinal plates and rigidly assembled to the latter, each of said boxes (8, 9, 10, 11) being removably disposed side by side inside the core casing (1) and bearing on said core casing without being attached thereto, so that the faces of said longitudinal plates directed towards the reactor core serve as bearing faces for said assemblies (24) disposed at the periphery of said core, each of said boxes (8, 9, 10, 11) being intercalated between said lower support plate (2) and said upper support plate (7) and fixed at its upper ends to said upper support plate by a flexible coupling (46, 47, 48) allowing each of said boxes to be displaced longitudinally.

2. A device according to claim 1, wherein at least one part of said longitudinal plates (14, 15) of said boxes is assembled together by keys (19) engaged in grooves (18a, 18b) provided in said plates in the longitudinal direction, over the whole length of said plates (14, 15).

3. A device according to claim 1, wherein said flexible coupling comprises a centering piece in two parts (46 and 47) telescoping in the longitudinal direction, with a spring (48) disposed between them, fixed to a reinforcing plate (41) disposed at the end of said box (10) which approaches said upper support plate 7 when it is put in position, said upper support plate (7) bearing a bearing device 49 which centers on the piece (46, 47) when said upper support plate (7) is put in position, causing said spring (48) to be compressed.

4. A device according to claim 1, wherein said flexible coupling comprises a centering piece (50) solid with said upper support plate (7), leaf springs (54) inserted between a reinforcing plate (52) at the end of said box (10) and said upper support plate (52) to engage with said centering piece (50) borne by said upper support plate (7).

5. A device according to claim 3 or 4, wherein said box (10) is associated at one of its ends with a flexible coupling apparatus (46, 47, 48) and at its other end with a centering piece (43) in said lower support plate (2).

6. A device according to any one of claims 1 to 4, wherein at least one part of said boxes (8, 9, 10, 11) includes a longitudinal plate (27, 28) associated with several longitudinal stiffening plates (29, 30) disposed perpendicularly to said longitudinal plate (27, 28) and rigidly fixed to said plate at its outer face directed towards said core casing (1).

7. A device according to any one of claims 1 to 4, wherein each of said boxes (8, 9, 10, 11) bears on said core casing (1) through transverse reinforcing plates (32) bearing on bearing rings (35) solid with the inner surface of said core casing (1).

8. A device according to any one of claim 1 to 4, including protective neutron-absorbent apparatuses (60, 61) or apparatuses for producing radio-active elements inside said boxes (8, 9, 10, 11) and fixed to said transverse reinforcing plates (32).

9. A device according to any one of claims 1 to 4, including apparatuses (63) for measuring, sampling or injecting liquid poison in the boxes and borne by said transverse reinforcing plates (32).

* * * * *